(12) United States Patent
Nishi

(10) Patent No.: US 10,372,584 B2
(45) Date of Patent: Aug. 6, 2019

(54) SOFTWARE INSPECTION APPARATUS

(71) Applicant: Hitachi, Ltd., Chiyoda-ku, Tokyo (JP)

(72) Inventor: Masataka Nishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 15/543,101

(22) PCT Filed: Jan. 30, 2015

(86) PCT No.: PCT/JP2015/052608
§ 371 (c)(1),
(2) Date: Jul. 12, 2017

(87) PCT Pub. No.: WO2016/121074
PCT Pub. Date: Aug. 4, 2016

(65) Prior Publication Data
US 2017/0364432 A1 Dec. 21, 2017

(51) Int. Cl.
*G06F 11/00* (2006.01)
*G06F 11/36* (2006.01)
(52) U.S. Cl.
CPC .............................. *G06F 11/3608* (2013.01)
(58) Field of Classification Search
CPC ........................... G06F 11/3608; G06F 11/28
See application file for complete search history.

(56) References Cited

U.S. PATENT DOCUMENTS

| | | | |
|---|---|---|---|
| 7,383,166 B2 * | 6/2008 | Ashar | G06F 17/504 703/13 |
| 8,176,496 B2 * | 5/2012 | Wang | G06F 11/3608 717/127 |
| 8,209,646 B2 * | 6/2012 | Chess | G06F 11/3608 716/106 |
| 8,381,199 B2 * | 2/2013 | Tateishi | G06F 9/4482 717/140 |
| 8,856,751 B2 * | 10/2014 | Li | G06F 8/436 717/126 |
| 9,141,354 B2 * | 9/2015 | Kuznetsov | G06F 8/42 |
| 9,436,582 B1 * | 9/2016 | Paruthi | G06F 11/3608 |
| 9,753,484 B1 * | 9/2017 | Marek | G06F 1/02 |

(Continued)

FOREIGN PATENT DOCUMENTS

JP 2012-155517 A 8/2012

OTHER PUBLICATIONS

International Search Report dated Apr. 21, 2015 as issued in corresponding International Application No. PCT/JP2015/052608.

(Continued)

*Primary Examiner* — Marc Duncan
*Assistant Examiner* — Jonathan D Gibson
(74) *Attorney, Agent, or Firm* — Foley & Lardner LLP

(57) ABSTRACT

While the effectiveness of a model inspection method as a means for detecting software defects is known, large-scale software cannot be handled due to great amounts of calculation required for inspection. According to the present invention, after a model inspection problem of software is attributed to be a satisfiability determination problem, the problem is converted to a type that can be solved by a solver used for solving a notification optimization problem having constrained conditions, and the satisfiability is determined in a numerically analytical manner.

6 Claims, 12 Drawing Sheets

(56) References Cited

U.S. PATENT DOCUMENTS

| | | | |
|---|---|---|---|
| 2004/0117772 A1* | 6/2004 | Brand | G06F 11/3608 717/132 |
| 2007/0271204 A1* | 11/2007 | Jiang | G05B 17/02 706/6 |
| 2007/0294196 A1* | 12/2007 | Musuvathi | G06F 11/3608 706/19 |
| 2009/0089783 A1* | 4/2009 | Wang | G06F 9/44589 718/100 |
| 2009/0265692 A1* | 10/2009 | Godefroid | G06F 9/44589 717/128 |
| 2011/0113285 A1* | 5/2011 | Dolby | G06F 11/3608 714/28 |
| 2011/0184705 A1* | 7/2011 | Ganai | G06F 11/3608 703/2 |
| 2012/0096440 A1* | 4/2012 | Tateishi | G06F 9/4482 717/126 |
| 2012/0151271 A1* | 6/2012 | Ganai | G06F 11/3612 714/38.1 |
| 2013/0283101 A1* | 10/2013 | Yang | G06F 11/3612 714/37 |
| 2014/0082594 A1* | 3/2014 | Li | G06F 8/436 717/126 |
| 2014/0278559 A1* | 9/2014 | Abadi | G06Q 40/08 705/4 |

OTHER PUBLICATIONS

Kazuhiro Yamato; "GDB de Application Trouble no Gen'in o Chosa", Nikkei Linux, May 8, 2010, vol. 12, No. 6, pp. 139 to 148, ISSN 1345-0182.

Tatsuhiro Tsuchiya; "Model Checking that Uses Satisfiability Solving", Computer Software, Jan. 26, 2012, vol. 29, No. 1, pp. 19 to 29, ISSN 0289-6540.

* cited by examiner

SOFTWARE INSPECTION APPARATUS

FIG. 2 PROCESS FLOW OF SOFTWARE INSPECTION APPARATUS

EXAMPLE OF INPUT VALUE CONSTRAINT, SOFTWARE, INSPECTION CONDITION

CONTROL FLOW GRAPH REPRESENTATION

COMPONENTS OF PARTIALLY-ORDERED GRAPHING SSA FORMAT

| 1 | START POINT |
|---|---|
| 2 | SSA ASSIGNMENT EXPRESSION |
| 3 | BRANCHING EVALUATION EXPRESSION |
| 4 | BRANCHING END EXPRESSION (PHI FUNCTION) |
| 5 | END POINT |

EXAMPLE OF PARTIALLY-ORDERED GRAPHING SSA FORMAT

MERGING OF INPUT VALUE CONSTRAINT AND INSPECTION CONDITION
AND GENERATION OF LIST OF CONSTRAINT FORMATS

FIG. 9
LIST OF CONSTRAINT FORMATS

| | CONSTRAINT FORMAT EXTRACTED FROM PARTIALLY-ORDERED SSA FORMAT |
|---|---|
| g1(X) | (INPUT VALUE CONSTRAINT) |
| g2(X) | $(y_0 = 0)$ |
| g3(X) | $(z_0 = 0)$ |
| g4(X) | $(w_0 = 0)$ |
| g5(X) | $(x_1 - 5 = 0)$ |
| g6(X) | $(x_2 - (x_1 - 3) = 0)$ |
| g7(X) | $\begin{bmatrix} \{(x_2 - 3 < 0) \wedge (y_1 - (x_2 * 2) = 0) \wedge (w_1 - y_1 = 0)\} \vee \\ \{\neg(x_2 < 3) \wedge (y_2 - (x_2 - 3) = 0)\} \end{bmatrix}$ |
| g8(X) | $(y_3 - \phi(y_1, y_2) = 0)$ |
| g9(X) | $(w_2 - (x_2 - y_3) = 0)$ |
| g10(X) | $(z_1 - (x_2 + y_3) = 0)$ |
| g11(X) | $(\neg(\text{INSPECTION CONDITION}))$ |

FIG. 10
SATISFIABILITY DETERMINATION PROBLEM USED FOR INSPECTION OF SOFTWARE $(\text{INPUT VALUE CONSTRAINT}) \wedge (y_0 = 0) \wedge (z_0 = 0) \wedge (w_0 = 0) \wedge (x_1 = 5) \wedge (x_2 = x_1 - 3)$
$\wedge [\{(x_2 < 3) \wedge (y_1 = x_2 * 2) \wedge (w_1 = y_1)\} \vee \{\neg(x_2 < 3) \wedge (y_2 = x_2 - 3)\}]$
$\wedge (y_3 = \phi(y_1, y_2)) \wedge (w_2 = x_2 - y_3) \wedge (z_1 = x_2 + y_3) \wedge (\neg(\text{INSPECTION CONDITION})) = true$

FIG. 11

INTERFACE FOR CONSTRAINED NUMERICAL OPTIMIZATION SOLVER

| | | SETTING INFORMATION | SYMBOL |
|---|---|---|---|
| INPUT INFORMATION | OBJECTIVE FUNCTION | OBJECTIVE FUNCTION | f(X)=0 |
| | | FIRST-ORDER DERIVATIVE OF OBJECTIVE FUNCTION | {df(X)/dv[1],...,df(V)/dv[n]}={0,...,0} |
| | UNDETERMINED VARIABLE | UNDETERMINED VARIABLE LIST | x={v[1],...,v[n]} |
| | | v[1] AND UPPER/LOWER LIMIT VALUE | XL[1]<=X[1]<=XU[1] |
| | | ... | |
| | | UNDETERMINED VARIABLE v[n] AND UPPER/LOWER LIMIT VALUE | XL[n]<=X[n]<=XU[n] |
| | CONSTRAINT EXPRESSION | g(X)[1] AND UPPER/LOWER LIMIT VALUE | gL[1]<=g(X)[1]<=XU[1] |
| | | FIRST-ORDER DERIVATIVE OF g(X)[1] | {dg(X)[1]/dX[1],..., dg(X)[1]/dX[n]} |
| | | SECOND-ORDER DERIVATIVE OF g(X)[1] | {dg(X)[1]/dX[1]dX[1],..., dg(X)[1]/dX[1]dX[n]},... {dg(X)[1]/dX[n]dX[1],..., dg(X)[1]/dX[n]dX[n]} |
| | | ... | ... |
| | | CONSTRAINT g(X)[m] AND UPPER/LOWER LIMIT VALUE | XL[m]<=g(X)[m]<=XU[m] |
| | | FIRST-ORDER DERIVATIVE OF g(X)[m] | {dg(X)[m]/dX[1],..., dg(X)[m]/dX[n]} |
| | | SECOND-ORDER DERIVATIVE OF g(X)[m] | {dg(X)[m]/dX[1]dX[1],..., dg(X)[m]/dX[1]dX[n]},... {dg(X)[m]/dX[n]dX[1],..., dg(X)[m]/dX[n]dX[n]} |

| | | |
|---|---|---|
| OUTPUT INFORMATION | IN CASE WHERE THERE IS SATISFYING SOLUTION | REPORT SPECIFIED ASSIGNED VALUES OF X={v[1],...,v[n]} |
| | IN CASE WHERE THERE IS NO SATISFYING SOLUTION | LIST OF CONSTRAINT EXPRESSIONS THAT ARE IMPOSSIBLE TO SATISFY AND FINAL ASSIGNED VALUE X |

FIG. 12
PROGRAM VARIABLE/SOLVER VARIABLE CONVERSION TABLE

| PROGRAM VARIABLE | FORM | SOLVER VARIABLE |
|---|---|---|
| x | signed int | v[1] |
| y0 | signed int | v[2] |
| z0 | unsigned int | v[3] |
| w0 | unsigned int | v[4] |
| x1 | signed int | v[5] |
| x2 | signed int | v[6] |
| y1 | signed int | v[7] |
| w1 | unsigned int | v[8] |
| y2 | signed int | v[9] |
| y3 | signed int | v[10] |
| w2 | unsigned int | v[11] |
| z1 | unsigned int | v[12] |

FIG. 13
GENERATION OF SOLVER VARIABLE VALUE RANGE CONSTRAINT

| SOLVER VARIABLE | VARIABLE VALUE RANGE CONSTRAINT |
|---|---|
| v[1] | MINSINT<=v[1]<=MAXSINT |
| v[2] | MINSINT<=v[2] ]<=MAXSINT |
| v[3] | MINUINT<=v[3] <=MAXUINT |
| v[4] | MINUINT<=v[4] <=MAXUINT |
| v[5] | MINSINT<=v[5] <=MAXSINT |
| v[6] | MINSINT<=v[6] <=MAXSINT |
| v[7] | MINSINT<=v[7] <=MAXSINT |
| v[8] | MINUINT<=v[8] <=MAXUINT |
| v[9] | MINSINT<=v[9] <=MAXSINT |
| v[10] | MINSINT<=v[10] <=MAXSINT |
| v[11] | MINUINT<=v[11] <=MAXUINT |
| v[12] | MINSINT<=v[12] <=MAXSINT |

FIG. 14

GENERATION OF DERIVATIVE EXPRESSION FOR EACH CONSTRAINT FORMAT

| | CONSTRAINT FORMAT EXTRACTED FROM PARTIALLY-ORDERED SSA FORMAT | CONSTRAINT EXPRESSION REPRESENTATION FOR SOLVER | FIRST-ORDER DERIVATIVE | SECOND-ORDER DERIVATIVE |
|---|---|---|---|---|
| g1(X) | (INPUT VALUE CONSTRAINT) | ... | | ... |
| g2(X) | $(y_0 = 0)$ | 0<=v[2]<=0 | {0,1,0,0,0,0,0,0,0,0,0} | 0 |
| g3(X) | $(z_0 = 0)$ | 0<=v[3]<=0 | {0,0,1,0,0,0,0,0,0,0,0} | 0 |
| g4(X) | $(w_0 = 0)$ | 0<=v[4]<=0 | | ... |
| g5(X) | $(x_1 - 5 = 0)$ | 0<=v[5]-5<=0 | | |
| g6(X) | $(x_2 - (x_1 - 3) = 0)$ | 0<=v[6]-(v[5]-3)<=0 | | |
| g7(X) | $\begin{bmatrix} \{((x_2 - 3 < 0) \land (y_1 - (x_2 * 2) = 0) \land (w_1 - y_1 = 0)\} \lor \\ \{\neg(x_2 < 3) \land (y_2 - (x_2 - 3) = 0)\} \end{bmatrix}$ | g7_b1_1(X)=v[6]-3;<br>g7_b1_2(X)=v[7]-(v[6]*2);<br>g7_b1_3(X)=v[8]-v[7];<br>g7_b2_1(X)=v[6]-3;<br>g7_b2_2(X)=v[9]-(v[6]-3);<br>{MINSINT<=g7_b1_1(X)<0,<br>0<=g7_b1_2(X)<=0,<br>0<=g7_b1_3(X)<=0} \|\|<br>{3<=g7_b2_1(X)<MAXSINT,<br>0<=g7_b2_2(X)<=0} | SELECT FOR EACH BRANCH PATH IN g7(X) | |
| g8(X) | $(y_3 - \phi(y_1, y_2) = 0)$ | ... | | |
| g9(X) | $(w_2 - (x_2 - y_3) = 0)$ | | | |
| g10(X) | $(z_1 - (x_2 + y_3) = 0)$ | | | |
| g11(X) | $(\neg(\text{INSPECTION CONDITION}))$ | | | |

FIG. 15
INSPECTION CONDITION FOR DETECTION OF OVERFLOW IN OPERATION $$\neg[(XL[1] <= X1] <= XU[1]) \wedge ... \wedge (XL[n] <= X[n] <= XU[n])]$$

FIG. 16
OUTPUT INFORMATION FROM CONSTRAINT FORMAT CONVERSION UNIT FOR NUMERICAL OPTIMIZATION SOLVER

| LARGE CLASSIFICATION | CONSTRAINT FORMAT FOR NUMERICAL OPTIMIZATION SOLVER |
|---|---|
| CONSTRAINT FORMAT P1 FOR NUMERICAL OPTIMIZATION SOLVER CONVERTED FROM LIST F1 OF CONSTRAINT FORMAT NOT INCLUDING INSPECTION CONDITION $P1 = (P1-1) \vee ... \vee (P1-X)$ | LIST P1-1 OF {OBJECTIVE FUNCTION, LIST OF CONSTRAINT FORMATS, FIRST/SECOND-ORDER DERIVATIVE OF CONSTRAINT FORMATS} DIVIDED FOR EACH BRANCH PATH |
| | .... |
| | LIST P1-X OF {OBJECTIVE FUNCTION, LIST OF CONSTRAINT FORMATS, FIRST/SECOND-ORDER DERIVATIVE OF CONSTRAINT FORMATS} DIVIDED FOR EACH BRANCH PATH |
| CONSTRAINT FORMAT P2 FOR NUMERICAL OPTIMIZATION SOLVER CONVERTED FROM LIST F2 OF CONSTRAINT FORMAT INCLUDING INSPECTION CONDITION $P2 = (P2-1) \vee ... \vee (P2-X)$ | LIST P2-1 OF {OBJECTIVE FUNCTION, LIST OF CONSTRAINT FORMATS, FIRST/SECOND-ORDER DERIVATIVE OF CONSTRAINT FORMATS} DIVIDED FOR EACH BRANCH PATH |
| | ... |
| | LIST P2-Y OF {OBJECTIVE FUNCTION, LIST OF CONSTRAINT FORMATS, FIRST/SECOND-ORDER DERIVATIVE OF CONSTRAINT FORMATS} DIVIDED FOR EACH BRANCH PATH |

FIG. 17
CONVERSION FROM CONSTRAINT FORMAT INCLUDING LOGICAL OR TO CONSTRAINT FORMAT CONCATENATED BY LOGICAL AND $$\bigwedge_{1 \le i \le M} \left( \bigvee_{1 \le j \le M_i} g_{i,j}(x) \ge 0 \right) \Leftrightarrow \bigwedge_{1 \le i \le M} \left( \bigwedge_{1 \le j \le M_i} g_{i,j}(x) - t_{i,j} = 0 \right) \wedge \left[ 0 \le p_{i, 1 \le j \le M_i} \le 1 \right] \wedge \left[ \sum_{i,j} p_{i,j} = 1 \right] \wedge \left[ \sum_j p_{i,j} t_{i,j} \ge 0 \right]$$

$$\bigvee_{1 \le i \le M} \left( \bigwedge_{1 \le j \le M_i} g_{i,j}(x) \ge 0 \right) \Leftrightarrow \bigwedge_{1 \le i \le M} \left( \bigwedge_{1 \le j \le M_i} g_{i,j}(x) - t_{i,j} = 0 \right) \wedge \left[ 0 \le p_{i, 1 \le j \le M_i} \le 1 \right] \wedge \left[ \sum_{i,j} p_{i,j} = 1 \right] \wedge \left[ \sum_j p_{i,j} t_{i,j} \ge 0 \right]$$

$$\left[ \bigvee_{1 \le j \le m} g_j(x) = 0 \right] \Leftrightarrow \left[ \bigwedge_{1 \le j \le m} g_{i,j}(x) - t_{i,j} = 0 \right] \wedge \left[ 0 \le p_{1 \le j \le M_i} \le 1 \right] \wedge \left[ \sum_j p_j = 1 \right] \wedge \left[ \sum_j p_{i,j} t_j^2 = 0 \right]$$

SOFTWARE INSPECTION APPARATUS

TECHNICAL FIELD

The present invention relates to a technology for inspecting software.

BACKGROUND ART

In recent years, it has become known that a method of dynamically analyzing an input/output relationship called a model inspection method is effective. The model inspection method is a method of constructing a model of a software 002 of which output value is dynamically determined according to an input value with respect to the software 002 and an internal state of the software 002 and evaluating validity of a dynamic behavior of the software 002 observed as an output value sequence output in time series from the model. Thus, the method searches for the existence of an input value or internal state corresponding to a problem violating a functional requirement and a safety requirement.

The model inspection method is a dynamic input/output relationship analysis method in the sense that the method defines an internal state value describing an internal state of the software 002 and searches for a state transition sequence corresponding to a problem by using a state transition model that implements a state transition rule corresponding to an input/output relation of the software 002. The following PTL 1 describes a technique relating to a model inspection method in the related art.

In particular, in order to speed up analysis, a software inspection apparatus 001 using a satisfiability determination function is disclosed. There is known a method using a Boolean SAT solver that makes a state value into a bit value and performs a binary tree search at a bit level and an SMT (Satisfiability Modulo Theory) solver that satisfies satisfiability using background logic.

CITATION LIST

Patent Literature

PTL 1: JP 2012-155517 A

Indeed, the model inspection method for a source code is effective as a method of reliably detecting potential problems of an in-vehicle software 002. Since the in-vehicle software 002 operates an internal state value sequence with respect to an input value sequence given in time series and outputs an output value sequence, the software is well in accordance with the characteristics of the model inspection method described above. In addition, in the standard ISO26262, a model inspection method is requested as a method of proving that authentication requirement of the software 002 is satisfied.

SUMMARY OF INVENTION

Technical Problem

Although the effectiveness of the model inspection method is known, there is a problem that large-scale software 002 cannot be handled due to a large amount of calculation required for the analysis. In addition, a signal process including programs that perform remarkably complicated operations rather than simple four arithmetic operations faces similar problems in the control software 002 or the like. In the method of converting the state value into a bit value, the number of state values is increased, and thus, the expandability is deteriorated. In addition, generally, the status value is not a bit value but a regular data in units of several bytes, and the efficiency is deteriorated even if a binary tree search is performed. Even in a method using the SMT solver proposed to solve the problem, the program processing unit which is not defined as background logic cannot be treated, and more practically, there is also a case where an effect of reduction of the amount of calculation required for the analysis cannot be expected.

Solution to Problem

A method of determining the satisfiability by numerical analysis after reducing the model inspection problem of software 002 to a satisfiability determination problem is effective. A solver used to solve a problem of a constrained nonlinear programming method provides a function of determining whether or not there is a solution satisfying a constraint expression under the value range constraint for given constraint and variable value, so that it is possible to perform determination at a sufficiently higher speed than the existing method.

Advantageous Effects of Invention

It is possible to solve a model inspection problem using a solver solving an existing satisfiability determination problem in a shorter time. Therefore, it becomes possible to apply the model inspection method to a large-scale program.

BRIEF DESCRIPTION OF DRAWINGS

FIG. 9 is a view illustrating a list of constraint formats.

FIG. 10 is a view illustrating satisfiability determination problem used for inspection of software 002.

FIG. 11 is a view illustrating an interface for a constrained numerical optimization solver.

FIG. 12 is a view illustrating a program variable/solver variable conversion table.

FIG. 13 is a view illustrating generation of solver variable value range constraint.

FIG. 14 is a view illustrating generation of derivative expression for each constraint format.

FIG. 15 is a view illustrating an inspection condition for detection of overflow in operation.

FIG. 16 is a view illustrating output information from a constraint format conversion unit for a numerical optimization solver.

FIG. 17 is a view illustrating conversion from constraint format concatenated by logical OR to constraint format concatenated by logical AND.

DESCRIPTION OF EMBODIMENTS

Hereinafter, specific procedures for realizing the present invention will be describe.

Embodiment

Figure 1:
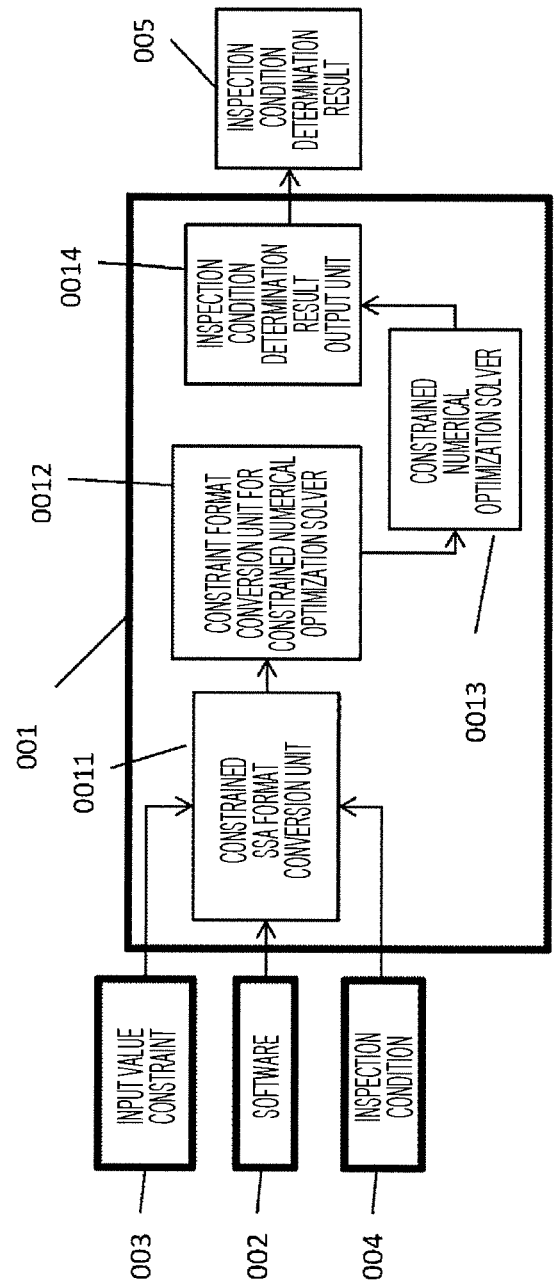
FIG. 1 is a view illustrating a software inspection apparatus 001.

FIG. 1 illustrates an internal configuration, input information, and output information of a software inspection apparatus 001.

The software inspection apparatus 001 is input with software 002 to be inspected, an input value constraint 003 for the software 002, and an inspection condition 004 on the software 002 and outputs an inspection condition determination result 005.

The software 002 uniquely determines an output value sequence on the basis of an initial value of a program internal state value and an input value sequence received from an outside. Therefore, the input value constraint 003 restricts the degree of freedom that the initial value of the program internal state value and the input value sequence can take, and the input value constraint designates the constraint corresponding to the precondition that the software 002 actually receives. As a result, the software 002 which has been input with an abnormal initial value or an abnormal input value sequence outputs an abnormal output value sequence and is used to solve the erroneous determination of the software inspection apparatus 001 that the inspection condition is violated as a natural consequence.

Figure 2:
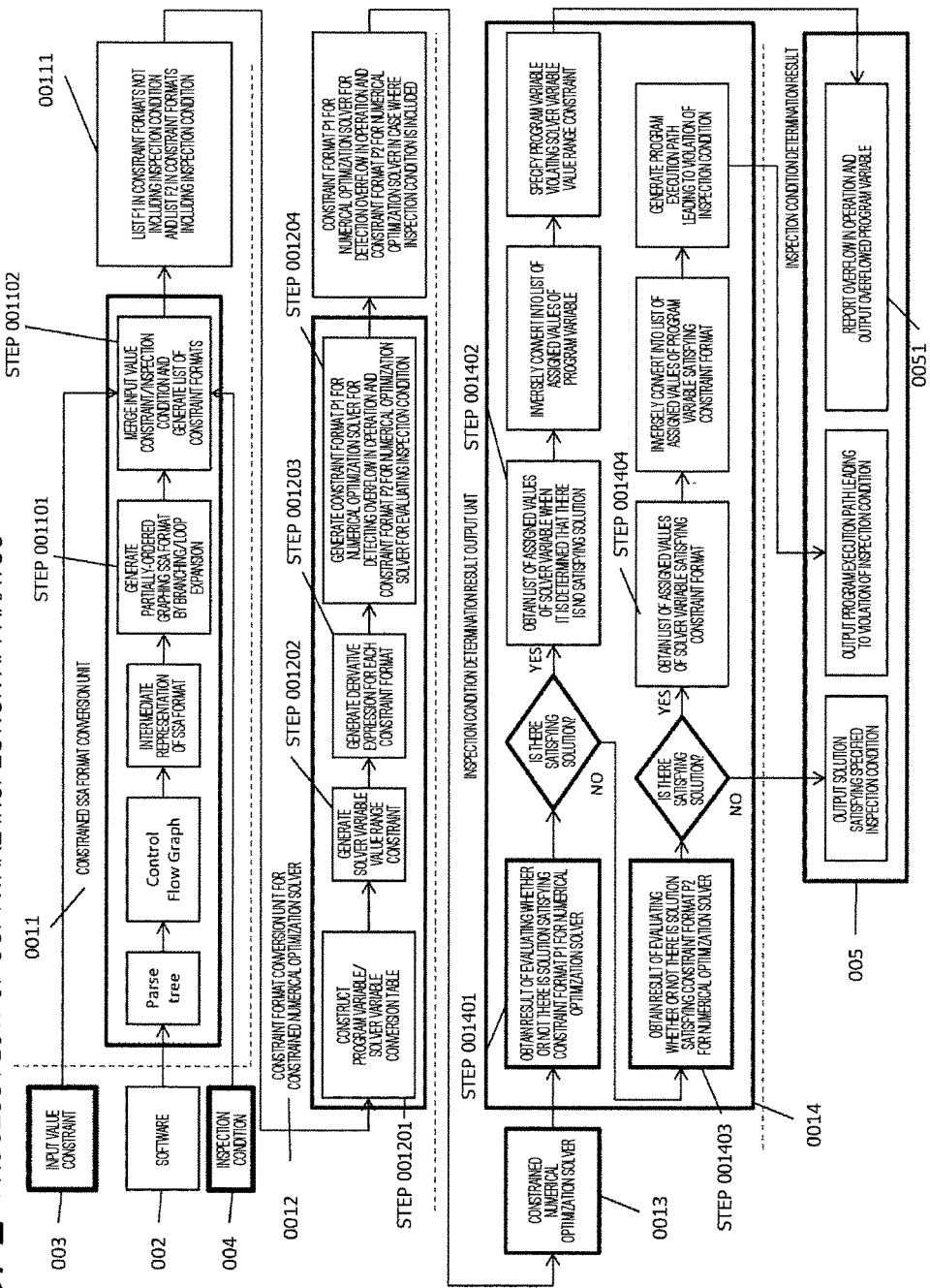
FIG. 2 is a view illustrating a process flow of the software inspection apparatus 001.

The software inspection apparatus 001 is configured to include a constrained SSA (Static Single Assignment) format conversion unit 0011, a constraint format conversion unit 0012 for a constrained numerical optimization solver, a constrained numerical optimization solver 0013, and an inspection condition determination result output unit 0014. FIG. 2 illustrates a process flow of the software inspection apparatus 001.

In the embodiment, in order to clarify that the difference in configuration from the existing method mainly exists in the solution of the satisfiability determination problem, as a procedure generally used the existing model inspection method known as Bounded Model Checking, the procedure being reduced to the satisfiability determination problem through an SSA (Static Single Assignment) format which is one of the intermediate expressions of the software 002 is inherited. The procedure for conversion into the SSA format is a model inspection method suitable for a case where the language structure of the software 002 to be inspected is primarily a procedural language. For example, in the case of inspecting the software 002 described in functional language, as long as the problem is finally reduced to a satisfiability determination problem, other intermediate representations in accordance with the language structure may be used.

The constrained SSA format conversion unit 0011 converts the software 002 into a parse tree, constructs a control flow graph, and converts the parse tree into an intermediate representation of the SSA format. Subsequently, in step 001101, the recursive execution processing unit represented by the branching condition and the loop included in the software 002 is expanded, and conversion into the partially-ordered graphing SSA format configured only by the branching condition expression and the assignment expression through operation is performed. Subsequently, in step 001102, with respect to the partially-ordered graphing SSA format the designated input value constraint 003 and the inspection condition 004 are merged, and a list of constraint formats is generated. Therefore, two lists of a list F1 of constraint formats not including the inspection condition 004 and a list F2 of constraint formats including the inspection condition 004 are output.

Although the procedure is a known method, specific examples of a conversion process are illustrated in FIGS. 3 to 7 in order to facilitate application of the present invention.

Figure 3:
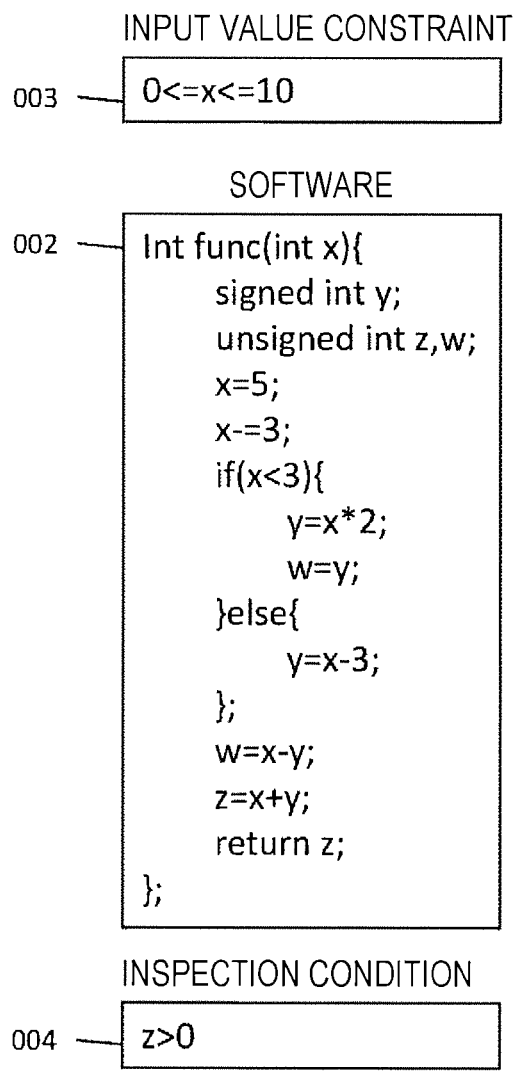
FIG. 3 is a view illustrating an example of an input value constraint 003, software 002, and inspection condition.

FIG. 3 illustrates an example of information to be input to the constrained SSA format conversion unit 0011. Due to the structured program theorem, in general, the procedural language software 002 can be represented by combining ordered operation procedures, branching conditions, and recursive conditions. An input value constraint 003 limiting an input value x to the software 002 and an inspection condition 004 to be inspected with respect to a return value z and program internal state values x, y, z, and w from the software 002 to be inspected are designated. As the inspection condition 004, generally, a functional requirement describing behaviors that the software 002 needs to satisfy, a motion constraint derived from a safety requirement of the software 002, and the like are used.

Figures 4, 5:
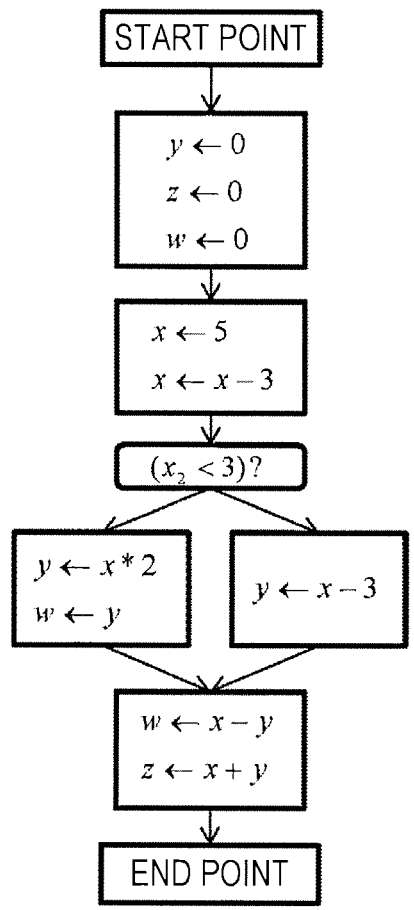
FIG. 4 is a view illustrating control flow graph representation.
FIG. 5 is a view illustrating components of a partially-ordered graphing SSA format.

FIG. 4 illustrates a control flow graph constructed by parsing the software 002. The nodes constituting the graph include the components illustrated in FIG. 5. Namely, the node includes a start point, an SSA assignment expression, a branching evaluation expression, a branching end expression called a phi function, and an end point. The recursive process corresponds to the case of a special structure where a branch path locally becomes a circulation graph.

Figure 6:
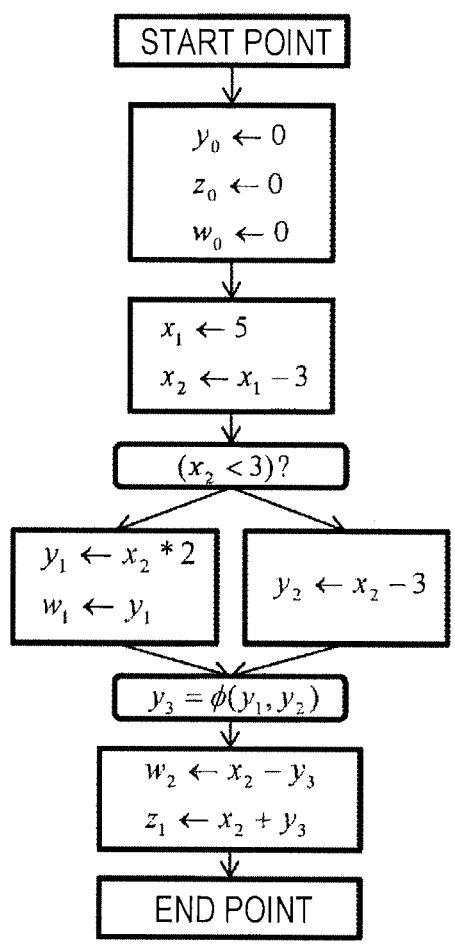
FIG. 6 is a view illustrating an example of a partially-ordered graphing SSA format.

FIG. 6 illustrates a result of conversion into the partially-ordered graphing SSA format obtained by converting into the SSA format and reconstructing so that the execution order from the start point to the end point is in the position direction. The characteristic of the SSA format is to set a new variable each time when an operation result is stored in a program variable through operation.

Figure 7:
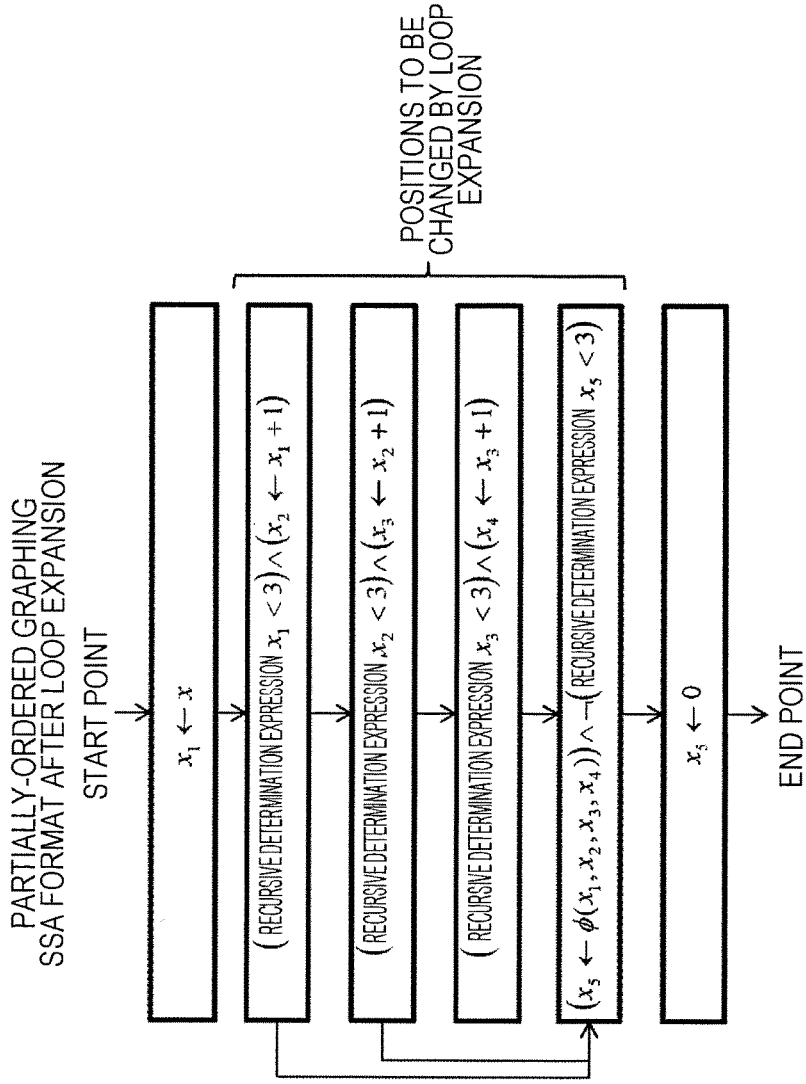
FIG. 7 is a view illustrating partially-ordered graphing of control flow graph including recursive process by loop expansion.

FIG. 7 illustrates a method of performing a recursive execution process represented by a while loop sentence, which is a partially-ordered graphing SSA format reconstructed by applying a method called loop unwinding. In an existing bounded model inspection method, the upper limit value corresponding to the number of times of recursive execution is set for each position of the loop, and the branching condition for each number of times of recursive execution is sequentially added, so that the reduced partially-ordered graphing SSA format illustrated in FIG. 6 is obtained.

Figure 8:
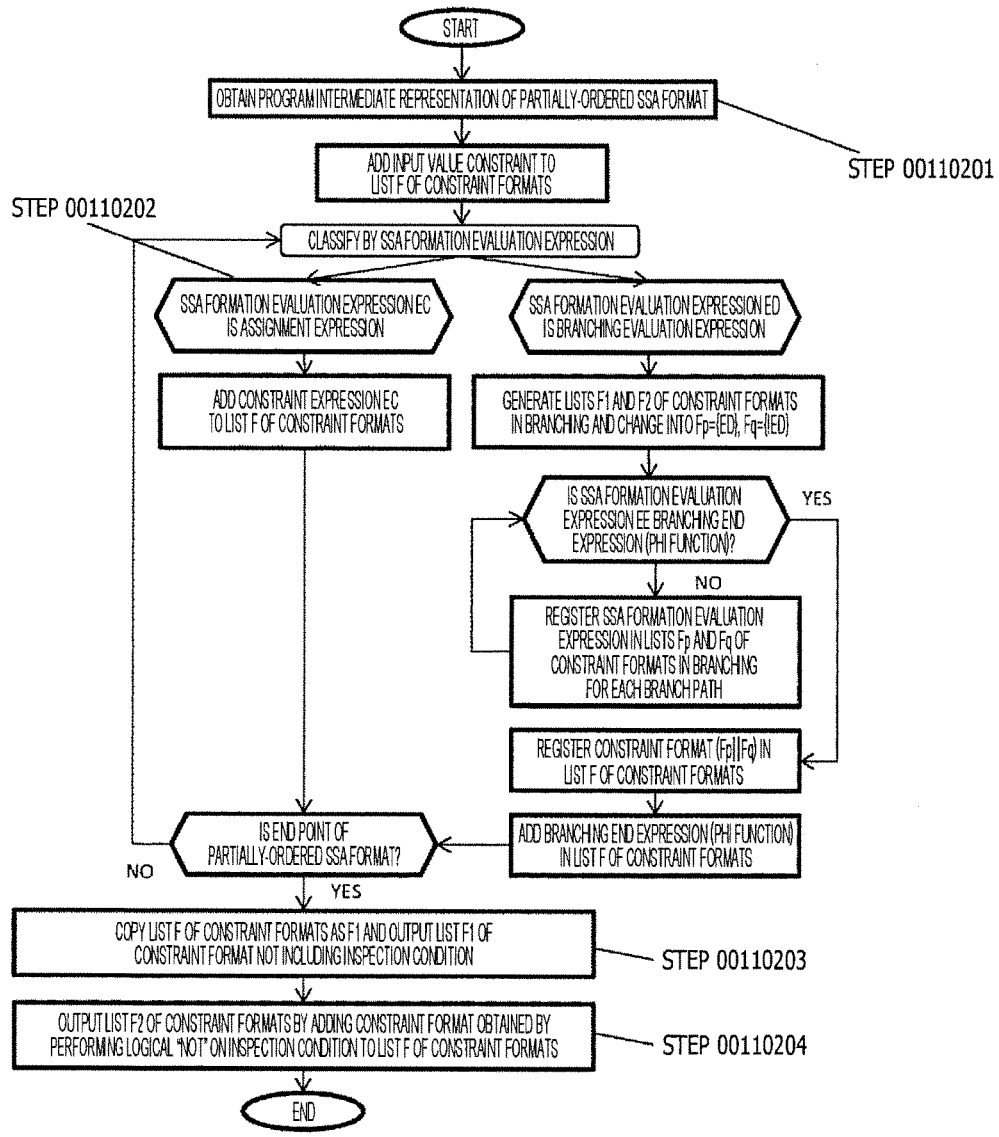
FIG. 8 is a view illustrating merging of input value constraint and inspection condition and generation of a list of constraint formats.

FIG. 8 illustrates the detailed procedure of step 001102.

In step 00110201, an intermediate representation of the software 002 in the partially-ordered graphing SSA format is acquired.

Herein, a relationship between program variables limited by an operation which is represented by the SSA assignment expression is referred to as a constraint format. Similarly, the designated input value constraint 003 can be regarded as a constraint format for program variables.

The constraint format corresponding to the input value constraint 003 is added to a newly defined empty list F.

Subsequently, the components are sequentially read from the start point of the program intermediate representation of the partially-ordered SSA format.

In a case where the evaluation expression EC is the SSA assignment expression (step 00110202), the assignment expression is added to the list F. In a case where the evaluation expression ED is the SSA branching evaluation expression (step 00110203), newly empty lists Fp and Fq of constraint formats corresponding to only the number (two as an example) of the division destinations are generated, and a constraint format indicating the fact that the branching evaluation expression is true, and a constraint format indicating the fact that the branching evaluation expression is false are registered, respectively. The constraint formats corresponding to the SSA assignment expression are added to the lists Fp and Fq of constraint formats up to the point where the branching process ends.

At the time when the branching process is completed, a constraint format (Fp∥Fq) obtained by taking logical OR of F1 and F2 is added to the list F of constraint formats, and an SSA branching end expression called a phi function is added. As long as the end point does not appear, the process continues to proceed, and the list F of constraint formats is updated.

If the end point is reached, in step 00110203, the list F of constraint formats is copied as F1, and the list F1 is output as a list of constraint formats not including the inspection condition 004. Subsequently, in step 00110204, the inspection condition 004 is converted into the constraint format, and a constraint format obtained by taking logical NOT thereof is added to the list F. The result is output as a list F2 of constraint formats, and the process is ended.

A list of constraint formats generated from the partially-ordered graphing SSA format illustrated in FIG. 6 and including the inspection condition is the same as illustrated in FIG. 9.

In addition, an existing model inspection method is a method of reducing to the problem of searching for a satisfying solution of the expression illustrated in FIG. 10. A method of obtaining a bit value of the program variable sequentially assigned at the time of conversion into the SSA format and using a Boolean SAT solver that searches for a satisfying solution and a method of reducing the list of constraint formats by using background logic and using an SMT solver solving a small-scale satisfiability determination problem in comparison with the case of obtaining a bit value and searching for a satisfying solution are used as methods of solving the individual satisfiability determination problem.

Returning to FIG. 2, the process flow of the software inspection apparatus 001 will be described.

The constraint format conversion unit 0012 for the numerical optimization solver receives the two lists F1 and F2 of constraint formats and converts the lists into formats that can be processed by the numerical optimization solver for determining the satisfiability.

The invention is to utilize the point that it is possible to determine satisfiability, that is, to solve the simultaneous equations at a sufficiently high speed in comparison with a Boolean SAT solver and an SMT solver by regarding the list of constraints illustrated in FIG. 9 as a kind of simultaneous equations and numerically calculating the solution of the simultaneous equations.

FIG. 11 illustrates an interface of the constrained numerical optimization solver 0013.

The input information is configured to include an objective function f, an unknown variable X, and a constraint expression g.

In a case where there is an assigned value X satisfying all the constraint expressions, the constrained numerical optimization solver 0013 reports a specific assigned value. In a case where there is no satisfying solution, the constrained numerical optimization solver reports a list of constraint expressions that are impossible to satisfy in the above-described constraint expression g and a final assigned value X.

The determined variable X described above includes a continuous value which is implemented by a floating point number or the like and an integer value. A constrained numerical optimization solver including an integer value is particularly referred to as an MINLP (Mixed Integer Nonlinear Programming) solver.

By using the first derivative with respect to each undetermined variable as an argument of the objective function f, it becomes possible to perform the evaluation accurately at a high speed. There is a solver that does not strictly require a first derivative to be designated by methods such as an automatic differentiation method and a local numerical differentiation method. However, in order to shorten the evaluation time, it is desirable to designate the first derivative. Similarly, in a case where there is not satisfying solution, in order to guarantee that there is not a satisfying solution, a value range constraint on the upper and lower limit values is added to the undetermined variable to make the evaluation range bounded.

Similarly, by designated the upper and lower limit values and the first and second derivatives in the constraint expression, it is possible to perform the evaluation accurately at a high speed.

In a case where the constraint expression is not differentiable and the first derivative cannot be defined within the value range set as the inspection range, the constraint expression may be divided at a point of discontinuity and replaced with the constraint format including the branching condition.

In general, the constrained numerical optimization solver 013 according to the embodiment can determine satisfiability with respect to a list of constraint formats concatenated by logical OR and logical AND of a plurality of constraint formats. However, combination complexity essentially exists, and a method for efficiently coping with the complexity is not established. An existing solver internally divides the problem into partial problems for each branching condition to generate problems that are concatenated by only logical AND. This is because, in the worst case, the number of variables can be determined with polynomial time if it is satisfiability concerning the logical product of the set constraint expression.

In fact, as illustrated in FIG. 9, the constraint format generated from the software 002 including the branching condition is included in a portion of the constraint format concatenated by logical OR. Therefore, the embodiment exemplifies a method of dividing the problem for each branching condition to generate a plurality of problems concatenated by logical AND and a method of introducing a constraint format group concatenated by logical OR as auxiliary variables and rewriting to a constraint format group concatenated by logical AND.

The lists F1 and F2 of constraint formats are converted so as to be matched with the interface of the solver 0013.

In step 001201, a conversion table retaining the correspondence between the SSA format program variables and the numerical optimization solver variables introduced in each component of the list of constraint formats is constructed. An example constructed from the list of constraint formats illustrated in FIG. 9 is illustrated in FIG. 12.

The program variable generally has a type and a value range. Since the software 002 unexpectedly behaves for arithmetic operations deviating from the value range represented by four arithmetic operations, before evaluating the inspection condition 004, the type information is used to check whether or not the arithmetic operation deviates from the value range.

In step 001202, the value range of the undetermined variable within the interface of the constrained numerical optimization solver 0013 is derived from the type information, a variable value range constraint as illustrated in FIG. 13 is set and transferred to the constrained numerical optimization solver 0013.

Similarly, in step 001203, constraint expressions and derivative groups are generated from components of the list of constraint formats by using the program variable/solver variable conversion table constructed in step 001201.

The constraint formats P1 and P2 for the numerical optimization solver are obtained by converting the list F1 of the constraint formats not including the inspection condition and the list F2 of the constraint format including the inspection condition, respectively.

Furthermore, in step 001204, the inspection condition for detection of overflow in operation illustrated in FIG. 15 is defined by removing the value range constraint of the undetermined variable X from the list P1 of constraint formats.

FIG. 16 illustrates an example of the constraint formats P1 and P2 for the numerical optimization solver and illustrates a typical configuration in a case where branching conditions are included in the program. The constraint formats P1 and P2 for the numerical optimization solver are configured by dividing the satisfiability determination problem for each branching condition and concatenating divided satisfiability determination problems by logical OR.

The individual constraint formats P1-1 to P1-X and P2-1 to P2-Y for the numerical optimization solver are evaluated through parallel execution by using a different computer, and it is determined determines whether or not there is a satisfying solution of any one or more constraint formats.

In addition, as exemplified in the above-described inspection condition for detection of overflow in operation, in the case of using an inspection condition in which a plurality of constraint formats are combined by logical AND, since a constraint format in which logical NOT is taken is incorporated into a satisfiability determination problem, logical OR of the constraint format is included. Since the numerical optimization solver can perform a process at high speed in a case where the constraint formats are concatenated with only logical AND, it is necessary to convert the constraint formats into an expression configured with only logical AND of constraint formats. In the case, as illustrated in FIG. 17, several auxiliary variables may be added to the list of solver variables, and the constraint format obtained by concatenating the constraint formats by logical OR may be converted into a constraint format obtained by concatenating the constraint format by logical AND. A format obtained by combining constraint formats obtained by taking logical OR of a plurality of constraint formats by logical AND is called CNF (Conjunctive Normal Form) format. A format obtained by combining constraint formats obtained by taking logical AND of a plurality of constraint formats by logical OR is called a DNF (Disjunctive Normal Form) format. It is known that a combination of a plurality of constraint formats arbitrarily concatenated by logical OR, logical AND, and logical NOT can be mechanically converted into a CNF format and a DNF format.

The constraint formats P1 and P2 for the numerical optimization solver is transferred to the solver 0013, and the satisfiability is evaluated. The inspection condition determination result output unit 0014 determines whether or not there is a satisfying solution and analyzes the satisfying solution and outputs an inspection condition determination result 005.

The determination contents are to determine whether or not there is deviation from the value range defined for each type of program variable represented by overflow in operation and to determine whether or not there is a program execution path violating the inspection condition 004 under the designated input value constraint 003.

In step 001401, it is determined whether or not there is a case where deviation from the value range defined for each type of the program variable occurs in advance. This step is necessary to prevent erroneous determination caused by a discrepancy between a return value obtained as a result of overflow in operation of an actual program variable and a solver variable without upper and lower boundary values.

A case where there is a satisfying solution denotes that an operation result with respect to a value that can arbitrarily be taken under the input value constraint 003 exceeds the solver variable value range specified in step 001202.

Since the software 002 is a procedural language, the case denotes that, in the process of receiving the value specified under the input value constraint 003 and performing the operation, although the return value that receives the operation result always exists, there is no satisfying solution. This is because the constraint added in step 001202 cannot be satisfied and the program variable corresponding to the return value cannot be within the range of the upper and lower limit values of the value range restricted by the designated type information.

In the case, the process proceeds to step 001402. A list of assigned values of solver variable at the time when it is determined that there is no satisfying solution is acquired, and by using the program variable/solver variable conversion table constructed in step 001201, the list is inversely converted into a list of assigned values of program variable.

During the inverse conversion, the position of the program variable deviating from the value range designated in step 001202 is specified. Finally, the process proceeds to step 0051 to report an overflow in operation and output an overflowed program variable, and the process is ended.

On the other hand, the evaluation result is acquired in step 001401. In a case where there is no overflow in operation, there is no satisfying solution, and an inspection range in the solver variable space to be inspected is connected. Therefore, it is confirmed that an unintended operation result is not obtained in the value range of the type of the program variable. In the case, the process proceeds to step 001403.

In step 001403, an evaluation result on whether or not there is a satisfying solution of the constraint format P2 for the numerical optimization solver is acquired. If there is no satisfying solution, it is reported that the designated inspection condition is satisfied, and the process is ended.

On the other hand, a case where there is a satisfying solution denotes that there is an improper input value violating the inspection condition 004 as an input value to the software 002 limited by the input value constraint 003 according to a "reduction to absurdity" method. In the case, the process proceeds to step 001404, and similarly, the list of assigned values of the solver variable satisfying the constraint format is inversely converted into a list of assigned values in the program variable. By using this, a program execution path leading to a violation of the inspection condition 004 is generated and reported as the inspection condition determination result 005, and the process is ended.

REFERENCE SIGNS LIST 001 software inspection apparatus 001
002 software 002
003 input value constraint 003
004 inspection condition
005 inspection condition determination result
0011 constrained SSA format conversion unit
0012 constraint format conversion unit for constrained numerical optimization solver
0013 constrained numerical optimization solver
0014 inspection condition determination result output unit

The invention claimed is:

1. A software inspection apparatus comprising a processor configured to:
receive software to be inspected, an input value constraint having an inspection range for an input value to the software, and an inspection condition designating a requirement that the software is to satisfy as input values;
inspect the software on the basis of the input values; and
output an inspection condition determination result,
wherein the processor executes the inspection of the software by satisfiability determination using a constrained optimization solver,
wherein the processor is further configured to:
convert the software into a constrained partially-ordered graphing SSA format;
generate a list of constraint formats by merging the input value constraint and the inspection condition;
generate a list of value range constrained constraint expressions and first and second derivative expressions of the constraint expression from the list of constraint formats; and
convert an output value from the constrained numerical optimization solver into a report on whether or not an overflow in operation occurs and a report on a determination result of the inspection condition.

2. The software inspection apparatus according to claim 1, wherein the solver includes:
a function of outputting an operation position causing overflow in a case where the overflow in operation occurs during a program execution process within a range of the input value constraint; and
a function of outputting a program execution path leading violation of the inspection condition in a case where there is an improper input value that violates the inspection condition.

3. A software inspection apparatus comprising a processor configured to:
receive software to be inspected, an input value constraint having an inspection range for an input value to the software, and an inspection condition designating a requirement that the software is to satisfy as input values;
inspect the software on the basis of the input values; and
output an inspection condition determination result,
wherein the processor executes the inspection of the software by satisfiability determination using a constrained optimization solver,
wherein the constrained optimization solver includes:
a function of outputting an operation position causing overflow in a case where the overflow in operation occurs during a program execution process within a range of the input value constraint; and
a function of outputting a program execution path leading violation of the inspection condition in a case where there is an improper input value that violates the inspection condition, and
wherein the processor is further configured to:
convert the software into a constrained partially-ordered graphing SSA format and further generate a list of constraint formats by merging the input value constraint and the inspection condition;
generate a list of value range constrained constraint expressions and first and second derivative expressions of the constraint expression from the list of constraint formats; and
convert an output value from the constrained numerical optimization solver into a report on whether or not the overflow in operation occurs and a report on a determination result of the inspection condition.

4. A software inspection apparatus comprising:
a processor configured to:
receive software to be inspected, an input value constraint having an inspection range for an input value to the software, and an inspection condition designating a requirement that the software is to satisfy as input values;
inspect the software on the basis of the input values; and
output an inspection condition determination result,
wherein the processor executes the inspection of the software by satisfiability determination using a constrained optimization solver,
wherein the constrained optimization solver includes:
a function of outputting an operation position causing overflow in a case where the overflow in operation occurs during a program execution process within a range of the input value constraint; and
a function of outputting a program execution path leading violation of the inspection condition in a case where there is an improper input value that violates the inspection condition, and
wherein the processor is further configured to:
convert the software into a constrained partially-ordered graphing SSA format; and
generate a list of constraint formats by merging the input value constraint and the inspection condition.

5. The software inspection apparatus according to claim 4, wherein the processor is further configured to generate a list of value range constrained constraint expressions and first and second derivative expressions of the constraint expression from the list of constraint formats.

6. The software inspection apparatus according to claim 4, wherein the processor is further configured to convert an output value from the constrained numerical optimization solver into a report on whether or not the overflow in operation occurs and a report on a determination result of the inspection condition.

* * * * *